United States Patent [19]
Mazzeo et al.

[11] 3,714,092
[45] Jan. 30, 1973

[54] SULFUR-CURED POLYURETHANES BASED ON A POLYESTER PREPARED FROM AZELAIC ACID, DIMER ACID AND LOWER ALKANE GLYCOLS

[75] Inventors: Michael P. Mazzeo, Highstown, N.J.; Anthony F. Santaniello, Newtown, Pa.

[73] Assignee: Thiokol Chemical Corporation, Bristol, Pa.

[22] Filed: July 27, 1971

[21] Appl. No.: 166,586

Related U.S. Application Data

[63] Continuation-in-part of Ser. No. 858,877, Sept. 17, 1969, abandoned.

[52] U.S. Cl. ..................260/22 TN, 260/18 TN
[51] Int. Cl. ..................C08g 22/10, C08g 17/16
[58] Field of Search..................260/18 TN, 77.5 AN

[56] References Cited

UNITED STATES PATENTS

| | | | |
|---|---|---|---|
| 3,043,807 | 7/1962 | Synder et al. | 260/75 |
| 3,402,135 | 9/1968 | Schwartz et al. | 260/22 |

OTHER PUBLICATIONS

Ferrari et al., I and EC, Vol. 50, No. 7, July, 1958, pages 1,041–1,044.
Cowan et al., I and EC, Vol. 38, pages 1,138–1,144.
Saunders et al., Polyurethanes, Vol. II, Interscience, New York, 1963, page 2, TP986P653.
Cowan et al., Jour. Amer. Oil Chem. Soc., Vol. 39, pages 534–545, 1962.

*Primary Examiner*—Donald E. Czaja
*Assistant Examiner*—H. S. Cockeram
*Attorney*—Thomas W. Brennan

[57] ABSTRACT

Sulfur-curable polyester urethane crude rubbers having improved hydrolysis resistance and excellent properties when exposed to low temperatures over a long period of time are prepared by the reaction of an organic diisocyanate with a polyester prepared from an acid mixture having 90/10 to 97/3 preferably 94/6 mole ratio of azelaic acid to a long chain dibasic acid and a polyol mixture having a 65/35 to 75/25 preferably 70/30 mole ratio of 1, 4-butanediol to propylene glycol followed by chain extension with a polyol having pendant aliphatic unsaturation.

1 Claim, No Drawings

SULFUR-CURED POLYURETHANES BASED ON A POLYESTER PREPARED FROM AZELAIC ACID, DIMER ACID AND LOWER ALKANE GLYCOLS

CROSS-REFERENCE TO RELATED APPLICATION

This application is a continuation-in-part of my application, Ser. No. 858,877 filed Sept. 17, 1969 now abandoned.

BACKGROUND OF THE INVENTION

This invention relates to sulfur-curable millable polyester-based urethane crude rubbers providing improved hydrolysis resistance and excellent low temperature properties in the cured product.

Sulfur-curable urethane crude rubbers are well known in the art. They may be prepared from polyesters having pendant non-benzenoid aliphatic unsaturation built in either before or after reaction with diisocyanates as described in U.S. Pat. No. 3,043,807 and French Pat. No. 1,322,416. The cured products are valued for their high tensile strength, good abrasion resistance and tear strength, and low compression set and oil swell. The sulfur-curable urethane crudes based on polyesters derived from shorter chained dibasic acids, e.g., adipic acid and glycols, e.g., adipic acid and glycols, e.g., ethylene or propylene glycol have poor resistance to hydrolysis and poor low temperature flexibility.

U.S. Pat. No. 3,043,807 teaches generally the preparation of urethane crude rubbers. In column 6, lines 1, 9 and 10 of U.S. Pat. No. 3,043,807, 1,3propylene glycol and 1,4-butylene glycol are disclosed. However, the critical proportions required in the present invention in order to retard crystallization of the urethane crude rubber at extended low temperatures are not disclosed.

U.S. Pat. No. 3,043,807 also discloses in column 6, line 5, the use of azelaic acid. However, the use of a dimer acid in critical proportions with the azelaic acid is not disclosed. The hydrolysis resistance has been improved by using a diol prepared by ring-opening of a lactone, e.g., caprolactone, as described in U.S. Pat. No. 3,186,971. However, in order to obtain improved low temperature properties, higher molecular weight (i.e., about 2,000) lactonediols must be used and this results in cured rubbers having undesirably high permanent set. Polyether urethane crudes, e.g., the commercially known Adiprene crudes, are usually used in areas where low temperature flexibility and hydrolysis resistance are required. Polyester based urethane crudes, however, are known to have better thermal stability and are less expensive than the polyether based urethane crudes. The products of the present invention combine the advantages of polyester based urethane crudes with physical properties, hydrolysis resistance and low temperature properties comparable to those of polyether based urethane crudes.

U.S. Pat. No. 3,402,135 teaches the use of stearic acid to improve the processability of the urethane crude rubbers.

U.S. Pat. No. 3,402,148 teaches a polyol with a M. W. range of 400–8,000. This reference does not teach the critical proportions between butylene glycol and propylene glycol required in the present invention nor does not this reference teach the use of a dimer acid used in critical amounts with the azelaic acid in order to obtain the necessary low temperature properties while retaining the present desired properties as taught in the present invention.

U.S. Pat. No. 3,296,211 teaches hydroxy-terminated polyesters.

It is believed that when the urethane crude rubbers are exposed to low temperatures crystallization occurs resulting in the crude rubber becoming harder and more brittle. Therefore, one method of measuring crystallization is accomplished by measuring the hardness of the crude rubber at these low temperatures. The most severe test is to expose the crude rubber to low temperatures for extended periods of time and then measure the hardness. All of the known art which was tested continued to crystallize at low temperatures over extended periods of time. The longer the crude rubber was exposed to temperatures as low as −20° to −40° F. the harder the material became or in other words crystallization continued.

It was discovered that a sulfur-curable polyester urethane crude rubber prepared by the reaction of an organic diisocyanate with a polyester prepared from azelaic acid and a polyol mixture having a 70/30 to 90/10 mole ratio of 1,4-butanediol to propylene glycol, followed by chain extension with a polyol having pendant aliphatic unsaturation crystalized slightly when exposed to low temperatures for extended periods of time. However, this composition still had superior hydrolysis resistance and excellent low temperature properties when compared to the known art.

Two changes were made in the above basic formulation which unexpectedly resulted in greatly improving this crystallization problem. These changes were made in the polyester. (1) The proportions of the polyol mixture were changed to a specific and critical amount and (2) a long chain dimer acid was added in specific and critical proportions to the azelaic acid. This formulation has unexpedtedly produced a sulfur-curable polyester urethane crude rubber that has excellent hydrolysis resistance and low temperature properties. This urethane crude rubber has excellent hardness properties or stabilized crystallization upon prolonged exposure to low temperatures, whereas, the other urethane crude rubbers continued to crystalize and become harder upon prolonged exposure to low temperatures. Of significant importance is the fact that the above improved properties were obtained while retaining the other necessary physical properties in the urethane crude rubber such as, the stress-strain properties, etc.

SUMMARY OF THE INVENTION

It is an object of the present invention to provide an easily processable polyester-based, millable, sulfur-curable urethane crude rubber which will provide a cured elastomer having improved hydrolysis resistance and excellent properties when exposed to low temperatures over a prolonged period of time. The object is accomplished by reacting a slight excess of organic diisocyanate with a polyester diol, prepared from an acid mixture having 90/10 to 97/3 preferably 94/6 azelaic acid to a long chain dibasic acid formed by the reaction of linoleic acid and oleic acid resulting in a $C_{36}$ dibasic acid and a polyol mixture having a 65/35 to 75/25 preferably 70/30 mole ratio of 1,4-butanediol (1,4-butylene glycol) to propylene glycol, followed by chain extension with a polyol containing pendant aliphatic unsaturation such as glycerol α-allyl ether or the monoallyl ether of trimethylolpropane. The crudes may be cured with sulfur using standard formulations and procedures known in the art.

DESCRIPTION OF THE PREFERRED EMBODIMENTS

In preparing the polyester, it is important to use a pure grade of azelaic acid. It was found that azelaic acid containing only 0.04 percent of a monobasic impurity produced an acceptable product whereas azelaic acid containing 0.5 percent of monobasic impurity gave a product with inferior stress-strain properties and hydrolysis resistance.

The long chain $C_{36}$ dibasic acids used with the azelaic acid in the preparation of the polyester is a reaction product of linoleic acid and oleic acid. The preferred di-basic acid is a $c_{36}$ dibasic acid sold by Emery Industries Inc., under the trademark Empol 1010 Dimer Acid. This dibasic acid has a neutralization equivalent of 284–294, acid value of 191–197, saponification value of 193–200, refractive index at 25° C. of 1.4752, specific gravity at 25°/20° C. of 0.936, specific gravity at 100°/20°C. of 0.897, pounds per gallon at 25° C. of 7.8, pour point 10° F, flash point 585° F, fire point 660° F., viscosity at 25° C., Gardner-Holdt Z-3, unsaponifiable 0.1 percent and surface tension 31.1 dynes/cm. at 25° C.

The acid mixture consisting of azelaic acid and the long chain $C_{36}$ dibasic acid, used in preparing the polyester, is a 90/10 to 97/3 preferably 94/6 mole ratio of azelaic acid to the long chain dibasic acid. These proportions are critical in order to obtain good low temperature properties over extended periods of time in the urethane crude rubber.

The polyol mixture of 1,4-butanediol (1,4-butylene glycol) and propylene glycol, used in preparing the polyester, is a 65/35 to 75/25 preferably 70/30 mole ratio of 1,4-butanediol to propylene glycol. These proportions are critical in order to obtain good low temperature properties over extended periods of time and excellent hydrolysis resistant properties in the urethane crude rubber while maintaining good stress-strain properties in the rubber.

The use of about 0.02 percent by weight of dibutyl tin oxide (DBTO) catalyst during the preparation of the polyester to speed up the reaction between the acid and the polyol, does not impair the properties of the cured product. The molecular weight of the polyester should be about 1,800 to 2,700 and the acid number should be 2.0 or less.

In preparing the urethane prepolymer, the polyester is reacted with an organic diisocyanate, preferably toluene diisocyanate (80/20 mixture of 2,4 and 2,6 isomers) using a NCO/OH ratio sufficient to provide about 2.9–3.2% NCO. The organic diisocyanate may be aromatic, aliphatic or cycloaliphatic in nature and may comprise a mixture of one or more of these. Representative compounds include m-phenylene diisocyanate; 4,4'-diphenylene diisocyanate; 4,4'-methylene diphenyl diisocyanate; 1,5-naphthalene diisocyanate; 4,4'-oxydiphenyl diisocyanate; 1,4-tetramethylene diisocyanate; 1,6-hexamethylene diisocyanate, 4,4'-methylenebis(cyclohexyl isocyanate). The diisocyanates may contain other substitutents such as alkyl or halogen but should be free of groups reactive with diisocyanates such as amino or hydroxyl. About 1.0 to 2.0, preferably 0.5 to 1.0, parts by weight of an aliphatic carboxylic acid containing from six to 25 carbon atoms, e.g., stearic acid, per 100 parts by weight of crude rubber may be added as a processing aid during the preparation of the prepolymer or during chain extension as described in U.S. Pat. No. 3,402,135.

The prepolymer is chain extended with a polyol containing an aliphatic unsaturated group using an NCO/OH ratio of 0.965/1 to 1.05/1 depending upon the Mooney viscosity desired. The preferred chain extenders are glycerol α-allyl ether and the monoallyl ether of trimethylolpropane (MAE). Other polyols containing pendant aliphatic unsaturated groups which may be used as chain extenders are described in U.S. Pat. No. 3,043,807. The unsaturated groups when cured with sulfur provide the necessary cross-linking for the desired physical properties.

Example 1 illustrates the preparation of a urethane crude rubber of the present invention using 96/4 mole ratio of azelaic acid to dimer acid and a 70/30 mole ratio of 1,4-butanediol to propylene glycol to form a polyester which was further reacted with toluenediisocyanate and stearic acid to form the urethane crude rubber.

Example 2 illustrates the preparation of a urethane crude rubber of the present invention using 90/10 mole ratio of azelaic acid to dimer acid and a 80/20 mole ratio of 1,4-butanediol to propylene glycol to form a polyester which was further reacted with toluenediisocyanate and stearic acid to form the urethane crude rubber.

Examples 3 and 4 illustrates the preparation of a urethane rubber using azelaic acid without the dimer acid and 60/40 mole ratio of 1,4-butanediol to propylene glycol to form a polyester which was further reacted with toluenediisocyanate and stearic acid to form a urethane crude rubber.

Example 5 illustrates the preparation of a urethane rubber using azelaic acid without the dimer acid and 70/30 mole ratio of 1,4-butanediol to diethylene glycol to form a polyester which was further reacted with toluenediisocyanate and stearic acid to form a urethane crude rubber.

Example 6 illustrates the preparation of a cured urethane rubber containing fillers utilizing the urethane crude rubbers produced in Examples 1-5.

The physical properties of the urethane crude rubbers of Example 6 were tested. These tests, the results of which are recorded in Tables I, II AND III, show the low temperature properties, hydrolysis resistance and oil swell characteristics of cured samples from Examples 1-5 which utilize the fillers of Example 6.

In the G 10,000 ASTM D 1043-69 test, a strip of the test material is obtained and a torsional force is applied to the test material while the temperature of the material is being lowered. As the test material becomes colder it becomes stiffer. When the modulus goes up to G 10,000, the temperature at that point is measured. Example 1 was lowered to −33° F. before the modulus reached G 10,000. In Example 2 the modulus was lowered to a −43° F. before the modulus reached G 10,000. The other Examples reached G 10,000 at −30° F. with the exception of Example 5 which reached −36° F. This test is testing the modulus increase upon cooling. Therefore as the dimer acid is added to the composition in Example 1 the temperature can be lowered from −30° F. shown in Examples 3 and 4 to −33° F. when 4 percent mole ratio of dimer acid is used. When larger amounts of dimer acid, such as, 10% mole ratio as in Example 2 is used the temperature was further lowered to −43° F. As mentioned earlier the use of the dimer acid with the azelaic acid in producing the polyester used to make the urethane crude produces a urethane crude which can be lowered to a temperature of between −33° F. and −43° F. before the G 10,000 measured is reached. This means that the composition of this invention has good low temperature stiffening properties.

In the Impact ASTM D 746-64T test, the brittleness of the test material is measured when the test material is lowered in temperature. In this test small strips of the material are lowered in temperature and then these strips are put in a jig which has a movable hammer which hits the test material. When the temperature becomes low enough the test material will break and that temperature is recorded. Example 1 had an impact temperature of −79° F. and Example 2 had an impact temperature of −90° F. The other Examples' impact temperatures, which contained no dimer acid, were between −62° and −70° F. The use of the dimer acid lowers the impact temperature a significant amount. This means the composition of this invention had good brittleness properties at low temperatures.

In the tensile ASTM D 412-68 test, a strip of the test material is placed in an Instron tester which pulls the sample or stretches the sample. The tensile strength is the number of psi required to break the sample. Examples 1 and 2 had a tensile strength of between 4,275 and 4,355. The other samples were equally as good. Therefore, no tensile strength has been lost using the composition of the present invention.

In the percent elongation ASTM D 412-68 test, the results indicates how much the test material will elongate before it will break. All the Examples tested essentially the same. Therefore, the composition of this invention did not lose any elongation properties. The composition of this invention as shown in Table II has excellent elongation properties.

In the Hardness D, ASTM D 2240-68 test, the sample material was tested for hardness at ambient temperatures as shown in Table II. Examples 1 and 2 had hardness values of 76 and 74 respectively. Therefore, the hardness properties at ambient temperatures were comparable to the material which did not contain the critical proportions of materials of this invention.

Hardness D using ASTM D 2240-68 was tested when the temperature was lowered in the test materials to −10° F., −20° F., −30° F. and −40° F. These results are recorded in Table III. Examples 1 and 2 show that when 4 percent mole dimer acid is added to the azelaic acid to form the polyester the formed urethane crude rubber exhibits little or no crystallization over prolonged periods at low temperatures. The compositions of examples 3 and 4 exhibit similar behavior but at a significant sacrifice in hydrolysis resistance.

In the tear ASTM D 624-54 test, a strip of the test material with a V shaped notch cut in the side of the sample is pulled from opposite ends until the sample tears. The force required to tear the strip is recorded as the tear strength. All the Examples tested essentially the same. Therefore, the composition of the present invention did not lose any tear strength properties. The composition of this invention, as shown in Table II, has excellent tear properties.

In the 200 percent modulus ASTM D 412-68 test, the sample material is stretched 200 percent and the force necessary to stretch the material that far is recorded. All the Examples tested essentially the same. Therefore, the composition of this invention did not lose any elongation properties. The composition of this invention, as shown in Table II, has excellent 200 percent modulus properties.

In the oil swell test a sample of the material is submerged in a standard ASTM oil No. 3 at 100° C. for 72 hours. The size of the material is measured before and after the submersion and the percent volume swell is calculated. The oil swell properties of the present invention are acceptable. However, Example 2 indicates that the addition of the dimer acid is directly proportional to the oil swell. The oil swell in Example 2 is not desirable. Therefore, the percent of dimer acid to azelaic acid and the percent of 1,4-butanediol to propylene glycol are critical in order to maintain the necessary good oil swell properties and stress-strain properties in the crude rubber while improving the hydrolysis resistance and physical properties upon exposure to low temperatures over a prolonged periods of time.

The invention is illustrated but not limited by the following examples in which the parts are by weight unless otherwise specified.

EXAMPLE 1

Preparation of the Polyester

Using an OH/COOH ratio of 1.1 of azelaic acid (9.6 moles) and dimer acid (0.4 moles) (Emery's 1010 Dimer Acid), 1,4-butanediol (7.0 moles) and propylene glycol (3.0 moles) and dibutyl tin oxide (0.35 g.) were heated together under nitrogen with agitation for a total reaction time of 24 hours, 18 hours of which were between 200° C. and 212° C. The polyester product had an OH number of 63.0, an acid number of 0.21, contained 0.04% $H_2O$ and an isocyanate equivalent of 935.

Preparation of the Urethane Crude

The polyester prepared above (935.0 g.), stearic acid (6.6 g.) and toluenediisocyanate (160.5 g.) were heated under nitrogen for 6 hours at 90° C. to form an NCO-terminated prepolymer having a 3.23% NCO content. 1085 grams of this prepolymer were chain extended with monoallyl ether of trimethylolpropane (MAE), (74.7 g., NCO/OH=0.98/1.0) at 120° C. for 24 hours to form a urethane crude rubber having a Mooney viscosity of 56 at 100° C.

This material was further processed in accordance with Example 6.

EXAMPLE 2

Preparation of the Polyester

Using an OH/COOH ratio of 1.1 of azelaic acid (9.0 moles) and dimer acid (1.0 moles) (Emery's 1010 Dimer Acid), 1,4-butanediol (8.0 moles) and propylene glycol (2.0 moles) and dibutyl tin oxide (0.36 g.) were heated together under nitrogen with agitation for a total reaction time of 51 hours, 47 hours of which were between 200° C. and 212° C. The polyester product had an OH number of 42.13, an acid number of 0.21, contained 0.04% $H_2O$ and an isocyanate equivalent of 1217.

Preparation of the Urethane Crude

The polyester prepared above (1,000.0 g.), stearic acid (6.7 g.) and toluenediisocyanate (148.5 g.) were heated under nitrogen for 6 hours at 90° C. to form an NCO-terminated prepolymer having a 3.32 NCO content. 1138 grams of this prepolymer were chain extended with monoallyl ether of trimethylolpropane (MAE) (79.9 g., NCO/OH=0.98/1.0) at 120° C. for 24 hours to form a urethane crude rubber having a Mooney viscosity of 54 at 100° C.

This material was further process in accordance with Example 6.

EXAMPLE 3

Preparation of the Polyester

Using an OH/COOH ratio of 1.1 azelaic (10 moles), 1,4-butanediol (6.0 moles) and propylene glycol (4.0 moles) were heated together under nitrogen with agitation for a total reaction time of 26 hours, 18 hours of which were between 200° C. and 212° C. The polyester product had an OH number of 52.33, an acid number of 0.55, contained 0.04% $H_2O$ and an isocyanate equivalent of 995.9.

Preparation of the Urethane

The polyester prepared above (433.3 g.), stearic acid (3.0 g.) and toluenediisocyanate (71.7 g.) were heated under nitrogen for 6 hours at 90° C. to form an NCO-terminated prepolymer having a 3.25% NCO content. 490 grams of this prepolymer were chain extended with monoallyl ether of trimethylolpropane (MAE) (33.6 g., NLO/OH=0.98/1.0) at 100° C. for 24 hours to form a urethane crude rubber having a Mooney viscosity of 35 at 100° C. for 24 hours to form a urethane crude rubber having a Mooney viscosity of 35 at 100° C.

This material was further processed in accordance with Example 6.

EXAMPLE 4

Preparation of the Polyester

Using an OH/COOH ratio of 1.1 azelaic acid (10 moles), 1,4-butanediol (6.0 moles) and propylene glycol (4.0 moles) were heated together under nitrogen with agitation for a total reaction time of 43 hours, 32 hours of which were between 200° C. and 212° C. The polyester product had an OH number of 56.0, an acid number of 1.99, contained 0.04% $H_2O$ and an isocyanate equivalent of 1,022.3.

Preparation of the Urethane Crude

The polyester prepared above (1,000 g.), stearic acid (7.0 g.) and toluenediisocyanate (163.1 g.) were heated under nitrogen for 6 hours at 90° C. to form an NCO-terminated prepolymer having a 3.12 NCO content. 1150 grams of this prepolymer were chain extended with monoallyl ether of trimethylolpropane (MAE) (75.9 g. NCO/OH=0.98/1.0) at 100° C. for 24 hours to form a urethane crude rubber having a Mooney viscosity of 19 at 100° C.

This material was further processed in accordance with Example 6.

EXAMPLE 5

Preparation of the Polyester

Using an OH/COOH ratio of 1.1 of azelaic acid (10 moles), 1,4-butanediol (7.0 moles) and diethylene glycol (3.0 moles) and dibutyl tin oxide (0.36 g.) were heated together for a total reaction time of 26 hours, 23 hours of which were between 200° C. and 212° C. The polyester product had an OH number of 52.14, an acid number of 0.12, contained 0.05% $H_2O$ and an isocyanate equivalent of 1,020.9.

Preparation of the Urethane Crude

The polyester prepared above (500.0 g.), stearic acid (3.5 g.) and toluenediisocyanate (81.6 g.) were heated under nitrogen for 6 hours at 90° C. to form an NCO-terminated prepolymer having a 3.18% NCO content. 570 grams of this prepolymer were chain extended with monoallyl ether of trimethylolpropane (MAE) (38.9 g., NCO/OH=0.965/1.0) at 120° C. for 24 hours to form a urethane crude rubber having a Mooney viscosity of 56 at 100° C.

This material was further processed in accordance with Example 6.

EXAMPLE 6

The urethane crude rubbers from Examples 1–5 were simply mixed individually on a rubber mill (a two roller type mill) with the following ingredients:

| | |
|---|---|
| Urethane crude rubber (Example 1–5) | 100 parts |
| Carbon Black (Philblack E[1]) | 30 parts |
| MBTS (mercaptobenzothiazyl disulfide) | 4 parts |
| MBT (mercaptobenzothiazole) | 2 parts |
| Zinc Chloride MBTS Complex (ZC 456 Activator[2]) | 1 part |
| Cadmium Stearate | 0.5 parts |
| Sulfur | 1.5 parts |

[1] Philback E is a carbon black supplied by Phillips Petroleum Co.
[2] ZC 456 is an activator supplied by Thiokol Chemical Corp.

The rubber after it was removed from the mill was cut into square sheets approximately ¼-inch thick. This material was then press-cured in standard molds. The test sheets were press-cured for 40 minutes at 287° F. These molds may be stainless steel cavity molds which are square molds with pressure type lids. The material is placed in the molds and the lids are pressed against the material while heat is being applied.

For the hardness measurements test plugs were used. These are ½-inch cylindrical shaped plugs cut from the press-cured material which was press-cured for 45 minutes at 287° F.

The physical properties of the urethane rubber compositions of Example 6 are recorded in Table I, II and III.

TABLE I

Properties of Urethane Crude Examples 1–5

| EXAMPLE | 1 | 2 | 3 | 4 | 5 |
|---|---|---|---|---|---|
| Polyol M.W. | 1870 | 2435 | 1992 | 2044 | 2040 |
| Prepolymer % NCO | 3.23 | 3.32 | 3.25 | 3.12 | 3.18 |
| NCO/OH Extension | 0.980 | 0.980 | 0.980 | 0.980 | 0.965 |
| Mooney viscosity | 56 | 54 | 35 | 19 | 56 |

TABLE II

Physical Properties of the Sulfur-Cured Urethane Crude Rubbers of Examples 1–5 Prepared as in Example 6

| Example No. | 1 | 2 | 3 | 4 | 5 |
|---|---|---|---|---|---|
| Low Temperature Properties | | | | | |
| °F. at G10,000 ASTM D1043-69 | −33°F. | −43°F. | −30°F. | −30°F. | −36°F. |
| °F. Impact ASTM D746-64T | −79°F. | −90°F. | −70°F. | −62°F. | −65°F. |
| Hydrolysis Resistance | | | | | |
| Initial Properties | | | | | |
| Tensile, psi ASTM D412-68 | 4275 | 4355 | 3,675 | 4,235 | 4,220 |
| % elongation ASTM D412-68 | 385 | 415 | 390 | 435 | 380 |
| Hardness D ASTM D2240-68 | 76 | 74 | 77 | 78 | 78 |
| Tear ASTM D624-54 | 315 | 270 | 300 | 270 | 260 |
| 200% Modulus ASTM D412-68 | 1,700 | 1,450 | 1,530 | 1,400 | 1,720 |
| 48 hrs. in H₂O at 100°C. | | | | | |
| Tensile, psi ASTM D412-68 | 1,855 | 1,740 | 1,380 | 870 | 1,430 |
| % Elongation ASTM D412-68 | 310 | 270 | 295 | 310 | 290 |
| Hardness D ASTM D2240-68 | 62 | 61 | 58 | 52 | 56 |
| Tear ASTM D624-54 | 125 | 120 | 95 | 60 | 100 |
| 200% Modulus ASTM D412-68 | 950 | 1,100 | 700 | 450 | 825 |
| Oil Swell Resistance Test | | | | | |
| (72 hrs. in ASTM oil No. 3 at 100°C.) | 20.1% | 32% | 14.8% | 15.8% | 14.8% |

TABLE III

Physical Properties of the Sulfur-cured Urethane Crude Rubbers of Examples 1–5 Prepared as in Example 6

| Example No. | 1 | 2 | 3 | 4 | 5 |
|---|---|---|---|---|---|
| Hardness, Shore D (−10°F.) | | | | | |
| Hrs. | | | | | |
| 1 | 59 | 50 | 58 | 60 | 48 |
| 3 | | 50 | | 58 | 51 |
| 6 | 59 | 51 | 56 | | 54 |
| 24 | 60 | 52 | 57 | 60 | 63 |
| 96 | 61 | 62 | 58 | 61 | 70 |
| 120 | 61 | 62 | 57 | 60 | 69 |
| 144 | 60 | | 57 | 61 | |
| 168 | 61 | | 59 | 62 | |
| Hardness, Shore D (−20°F.) | | | | | |
| Hrs. | | | | | |
| 1 | 61 | 55 | 62 | | 57 |
| 3 | 62 | 56 | 63 | | 58 |
| 6 | 61 | 56 | 62 | | 57 |
| 24 | 63 | 58 | 64 | | 63 |
| 48 | 62 | 60 | 62 | | 64 |
| 72 | 60 | 62 | 62 | | 67 |
| 96 | 62 | 63 | 63 | | 68 |
| 192 | 62 | 65 | 63 | | 72 |
| Hardness, Shore D (−30°F.) | | | | | |
| Hrs. | | | | | |
| 1 | 71 | 65 | 68 | 72 | 67 |
| 3 | 71 | 68 | 69 | 73 | 68 |
| 6 | 72 | 67 | 72 | 73 | 69 |
| 24 | 72 | 68 | 72 | 74 | 70 |
| 96 | 71 | 70 | 71 | 74 | 70 |
| 120 | 70 | 73 | 71 | 75 | 72 |
| 142 | 73 | 73 | 70 | 76 | 72 |
| Hardness, Shore D (−40°F.) | | | | | |
| Hrs. | | | | | |

| | | | | | |
|---|---|---|---|---|---|
| 1 | 76 | | 75 | 74 | |
| 2 | 74 | 72 | 75 | 74 | 77 |
| 3 | 76 | | 75 | 74 | |
| 5 | 75 | 73 | 75 | 75 | 74 |
| 24 | 77 | 74 | 76 | 76 | 74 |
| 96 | 76 | 75 | 77 | 77 | 74 |
| 120 | 78 | 77 | 77 | 78 | 75 |

What is claimed is:

1. A sulfur-cured urethane crude rubber having excellent hydrolysis resistance and excellent properties when exposed to low temperatures over prolonged periods of time comprising the reaction product of a polyol containing a pendant aliphatically unsaturated group with an isocyanate-terminated polyester which is the reaction product of an organic diisocyanate and a polyester polyol prepared from a 90/10 to 97/3 molar ratio of azelaic acid to a $C_{36}$ dimer acid and a 65/35 to 75/25 molar ratio of 1,4-butanediol to propylene glycol.

* * * * *